United States Patent Office 2,876,231
Patented Mar. 3, 1959

2,876,231

CERTAIN OXAZOLO BENZOTHIAZOLE COMPOUNDS AND PROCESS

Lester Horwitz, St. Albans, N. Y., assignor to General Aniline & Film Corporation, New York, N. Y., a corporation of Delaware No Drawing. Application February 25, 1957
Serial No. 641,875

8 Claims. (Cl. 260—304)

This invention relates to 2,6-disubstituted oxazolo-[4,5-f]benzothiazole and more particularly to 2-methyloxazolo[4,5-f]benzothiazoles which are substituted in the 6-position by an alkyl, aryl or aralkyl group; the quaternary salts thereof, sensitizing dyes derived therefrom, and silver halide emulsions sensitized with such dyes.

Diazole radicals such as benzobisthiazoles have already been recommended as intermediates in the preparation of certain cyanine dyes. However, the synthetic methods described so far provide only diazole nuclei in which the azole nuclei attached to the benzene moiety are identical.

I have now found that extremely valuable sensitizing dyes may be prepared from oxazolo[4,5-f]benzothiazoles which contain alkyl or aralkyl groups in the 2-position and alkyl, aryl or aralkyl groups in the 6-position. These bases, which are readily quaternized by conventional methods, can be reacted with cyclammonium quaternary salts containing a reactive group on the α-carbon to produce inter alia, mono- and poly-methine cyanine dyes which are valuable sensitizers for silver halide emulsions.

Among the objects of my invention are said bases, their preparation, quaternary salts derived therefrom, sensitizing dyes produced with said quaternary salts, and silver halide emulsions sensitized with said dyes.

The new bases, the preparation and use of which are contemplated herein, are 2,6-disubstituted oxazolo[4,5-f]benzothiazoles having the following structure:

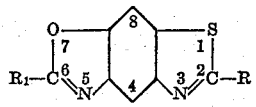

wherein R is alkyl such as methyl, ethyl, propyl, butyl and the like; aralkyl such as benzyl, phenethyl and the like; $R_1$ is alkyl such as methyl, ethyl, propyl, butyl and the like; aryl such as phenyl, tolyl, xylyl and the like; aralkyl such as benzyl, phenethyl and the like.

These compounds are prepared as follows:

2-amino-5-hydroxybenzenethiol prepared by the alkali fusion of a 6-alkoxy substituted benzothiazole as described in Clark, Doorenbos and Horwitz' U. S. application, Serial Number 633,198, filed on January 9, 1957 is converted by treatment with an acid anhydride, e. g., acetic anhydride, propionic anhydride, butyric anhydride, or an acyl halide, e. g., acetyl chloride, propionyl chloride, phenylacetyl chloride, phenylpropionyl chloride to a 6-acyloxybenzothiazole which is substituted in the 2-position by an aralkyl or alkyl group. Hydrolysis or saponification of the 6-acyloxybenzothiabole with dilute alkali, e. g., sodium hydroxide leads to the 6-hydroxy-2-alkyl-(or -2 aralkyl) benzothiazole (I) which is converted by coupling with a diazonium salt such as phenyldiazonium chloride or another suitable aryldiazonium chloride into 2-alkyl-(or aralkyl) -5-phenyldiazo-6-hydroxybenzothiazole (II). Reduction with sodium hydrosulfite in alkaline medium leads to the 2-alkyl-5-amino-6-hydroxybenzothiazole (III). Finally, refluxing the latter with an acid anhydride or with an acyl halide, followed by successive distillation of the excess anhydride and of the reaction product yields the 2,6-disubstituted oxazolo[4,5-f]benzothiazole (IV). These reactions are illustrated by the following formulae.

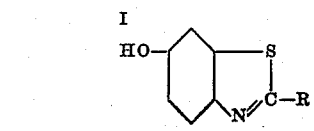

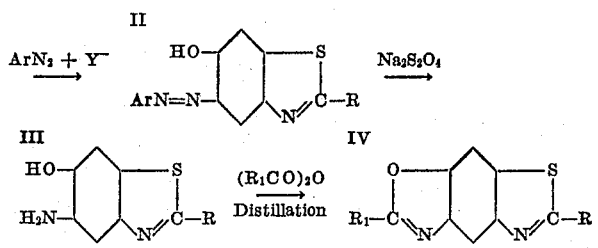

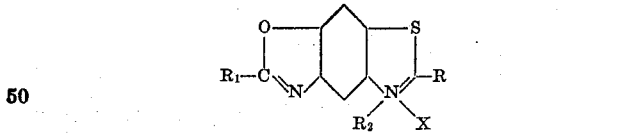

wherein R and $R_1$ have the values given above, Ar is the aryl residue of the diazonium salt and Y is an anion such as chloride, bromide, sulfate and the like.

The above obtained oxazolobenzothiazole base may be readily quaternized by conventional methods to produce the desired cyclammonium quaternary salts for the cyanine dye synthesis; for instance, the methiodide or ethiodide is obtained by heating the base with methyl or ethyl iodide under pressure in a sealed container for several hours at 96–100° C. The quaternary salts obtained are characterized by the following general formula:

$$\text{structure}$$

wherein R and $R_1$ have the values given above, $R_2$ is alkyl such as methyl, ethyl, propyl, β-hydroxyethyl,γ-hydroxypropyl, carboxymethyl, carboxyethyl, and the like; aralkyl, e. g., benzyl, phenethyl and the like, and X is an anion such as chloride, bromide, iodide, perchlorate p-toluenesulfonate and the like.

The above quaternary ammonium salts may be converted to sensitizing dyes characterized by the following general formula:

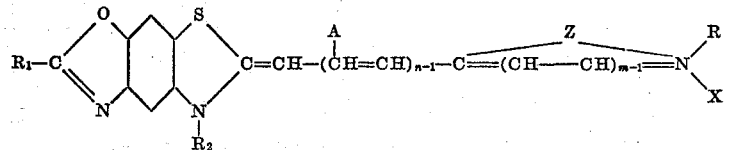

wherein $R_1$ and $R_2$ have the values given above, n represents a positive integer of from 1 to 4; m represents a positive integer of from 1 to 2; A represents hydrogen or a lower alkyl group such as methyl, ethyl and the like; $R_3$ represents an alkyl group such as methyl, ethyl, propyl, butyl, amyl; a hydroxyalkyl group such as hydroxymethyl, hydroxyethyl, hydroxypropyl and the like; carboxyalkyl such as carboxymethyl, carboxyethyl, carboxypropyl; aralkyl, e. g., benzyl, phenethyl and the like; X represents an acid radical e. g., Cl, Br, I, ClO$_4$, SO$_4$CH$_3$, SO$_4$C$_2$H$_5$, SO$_3$C$_6$H$_4$CH$_3$, and the like, and Z represents the atoms necessary to complete a 5- or 6-membered nitrogenous heterocyclic system of the type used in cyanine dyes, such as pyridine, lepidine, quinoline, indoline, oxazole, thiazoline, thiazole, selenazole, selenazoline, oxazoline, benzothiazole, benzoselenazole, benzoxazole, naphthothiazole, and the like.

These sensitizing dyes are prepared by heating the above oxazolobenzothiazolium salts in the presence of an acid binding agent such as pyridine, trimethylamine, triethylamine, and the like with a cyclammonium quaternary salt having a reactive grouping on the carbon atom in the 2-position of the heterocyclic ring such as a halogen atom, e. g., chlorine, bromine or the like; an alkyl mercapto group, e. g., methylmercapto, ethylmercapto and the like; an alkylmercaptovinyl group, e. g., β-methylmercaptovinyl, β-ethylmercaptovinyl and the like, β-alkylmercapto-β-alkylvinyl, e. g., β-methylmercapto-β-methylvinyl, β-ethylmercapto-β-ethylvinyl and the like; β-acetanilidovinyl, 4-acetanilido-1,3-butadienyl, and 6-acetanilido-1,3,5-hexatrienyl.

As examples of suitable cyclammonium quaternary cyanine dye salt intermediates having a reactive group in the 2-position to the nitrogen atom thereof so as to form a monomethine dye, the following may be mentioned:

2-methylmercapto-6-methylquinoline ethiodide
2-methylmercaptopyridine ethiodide
2-methymercaptothiazoline ethiodide
2-phenylmercaptothiazoline ethiodide, and the like In preparing trimethine cyanine dye salts, the following cyclammonium quaternary dye salt intermediates having a reactive group in the β-position of the side chain in the 2-position of the nitrogen atom thereof may be employed:

2-(β-acetanilidovinyl)thiazoline ethiodide
2-(β-acetanilidovinyl)benzothiazole ethiodide
2-(β-acetanilidovinyl)benzoxazole ethiodide
2 - (β-ethyl-β-methylmercaptophenyl) - 5 - methoxybenzoselenazole ethiodide
2 - (β-methylmercapto - β - methylvinyl)benzothiazole ethiodide
2 - (β-methylmercapto - β - propylvinyl)benzothiazole ethiodide In preparing pentamethine and heptamethine cyanine dyes, the following cyclammonium quaternary salts having a reactive group in delta- and zeta-positions of the side chain in 2-position of the nitrogen atom thereof may be employed.

2-(4-acetanilido-1,3-butadienyl)pyridine ethiodide
2-(4-acetanilido-1,3-butadienyl)benzoxazole ethiodide
2-(4-anilino-3-methyl-1,3-butadienyl)pyridine ethiodide
2 - (4-anilino-3-methyl - 1,3 - butadienyl)-β-naphthoxazole ethiodide
2 - (4-anilino-3-ethyl - 1,3 - butadienyl)-α-naphthothiazole ethiodide
2-(6-anilino-1,3,5-hexatrienyl)thiazoline ethiodide
2-(6-anilino-1,3,5-hexatrienyl)-α-naphthothiazole ethiodide
2-(6-anilino-1,3,5-hexatrienyl)-β-naphthothiazole ethiodide
2-(6-anilino - 1,3,5 - hexatrienyl)-α-naphthoselenazole ethiodide
2-(6-anilino - 1,3,5 - hexatrienyl)-β-naphthoselenazole ethiodide
2 - (6-anilino-4-methyl - 1,3,5 - hexatrienyl)thiazoline ethiodide
2-(6-anilino - 4 - methyl - 1,3,5 - hexatrienyl)benzothiazole ethiodide
2-(6-anilino - 4 - butyl - 1,3,5 - hexatrienyl)benzothiazole ethiodide The new dyes of my invention have been found to be particularly useful since they operate to increase the sensitivity of photographic emulsions containing color formers fast to diffusion to a higher extent than comparable sensitizing dyes without the oxazolobenzothiazole nucleus. The sensitizing bands of the new dyes of my invention are unusually sharp so that they render themselves advantageously for use in color emulsions.

The invention is further illustrated by the following examples although it is to be understood that the invention is not to be restricted thereto.

PREPARATION OF INTERMEDIATES

*Example I.—2-methyl-5-phenyldiazo-6-hydroxybenzothiazole*

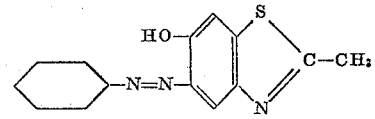

To 13.8 grams of 2-methyl-6-hydroxybenzothiazole, prepared according to Example XX of U. S. application Serial Number 633,198, dissolved in 60 mls. of 10 percent sodium hydroxide solution, was first added 70 grams of ice and then added a solution of phenyldiazonium chloride prepared from 8.9 grams of aniline, 25 mls. of concentrated hydrochloric acid solution and 97 grams of ice, to which had been added, dropwise, a solution of 6.6 grams of sodium nitrite in 14 mls. of water. The mixture formed a reddish brown precipitate. This was isolated by filtration and allowed to dry. Yield 93%.

*Example II.—2-methyl-5-amino-6-hydroxybenzothiazole*

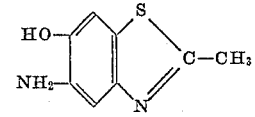

The product prepared according to Example I was dissolved in a solution prepared from 20 grams of sodium hydroxide and 165 mls. of water. The reaction mixture was heated to 90–95° C. on the steam bath and 42 grams of sodium hydrosulfite was added. Stirring was continued for 10 minutes after the addition. The reaction mixture was cooled to room temperature and then extracted with ether. The aqueous layer was rendered neutral by the addition of acetic acid; the product which precipitated out was collected and dried; yield 11.95 grams. Recrystallization from a methanol-water mixture gave a pure product melting with decomposition at 193° C.

*Example III.—2,6-dimethyloxazolo[4,5-f]benzothiazole*

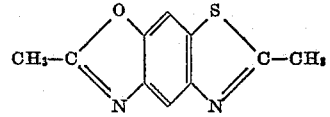

A mixture of 12 grams of 2-methyl-5-amino-6-hydroxybenzothiazole, 50 mls. of acetic anhydride, and 20 mls. of glacial acetic acid was refluxed for 70 minutes. The acetic anhydride and acetic acid were removed by distillation under reduced pressure provided by an aspirator (12 mm). The residue was distilled using a vacuum pump at a pressure of 3–4 mm. The yellow oil which came over between 160–170° C. solidified upon cooling. Recrystalization from acetonitrile provided a pure product melting at 270° C. Yield 8.7 grams.

*Example IV.—2,3,6-trimethyloxazole[4,5-f]-benzothiazolium iodide*

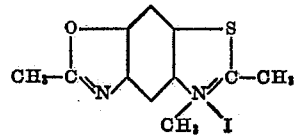

Two grams of the product of Example III and 7 mls. of methyl iodide were heated in a bomb on the steam bath for 5 hours. The resulting quaternary salt was purified by washing with ether; M. P. 253.5° C.

*Example V.—3-ethyl-2,6-dimethyloxazolo[4,5-f]-benzothiazolium iodide*

Two grams of the product of Example III and 5 mls. of ethyl iodide were heated in a sealed container for 6 hours at 96–100° C.

*Example VI.—3-carboxymethyl-2,6-dimethyloxazolo-[4,5-f]benzothiazolium bromide*

Two grams of the product of Example III and 1.75 grams of bromoacetic acid were fused together in a sealed container at 140° C. for 4 hours. The resulting product was triturated with ether and acetone, filtered and dried.

*Example VII.—3-carboxyethyl-2,6,dimethyloxazolo-[4,5-f]benzothiazolium iodide*

Two grams of the product of Example III and 2.2 grams of iodopropionic acid were heated together in a sealed container at 135° C. for 3½ hours. The resulting product was purified by washing with ether and dried.

PREPARATION OF DYES

*Example VIII.—1'-ethyl-3-methyl-5,6-[2-methyloxazolo 4,5]thiapseudocyanine iodide*

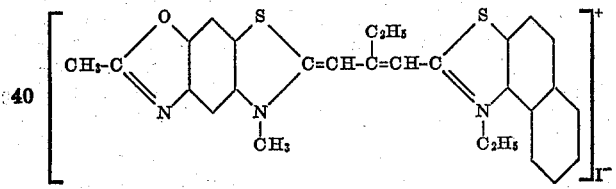

A mixture of 0.346 gram (0.001 mole) of 2,3,6-trimethyloxazolo[4,5-f]benzothiazolium iodide, 0.345 gram (0.001 mole) of 1-ethyl-2-ethylmercaptoquinolinium iodide, 5 mls. of methanol and 10 drops of triethylamine was heated and kept at boiling for 5 minutes. The resultant dye was filtered off and purified by boiling with methanol. It had an absorption maximum of 484 mµ.

*Example IX.—3,1'-diethyl-6'-methoxy-5,6-[2-methyloxazolo 4,5]thiapseudocyanine iodide*

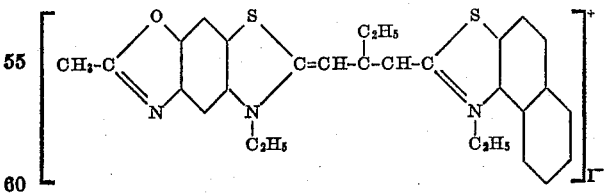

This dye was prepared from 0.35 gram (0.001 mole) of 2,6-dimethyl-3-ethyloxazolo[4,5-f]benzothiazolium iodide and 0.38 gram (0.001 mole) of 1-ethyl-2-ethylmercapto-6-methoxyquinolinium iodide according to the procedure described in Example VIII. The absorption maximum in ethanol was 495 mµ.

*Example X.—3-carboxyethyl-3'-ethyl-6'-methoxy-5,6-[2-methyloxazolo 4,5]thiapseudocyanine iodide*

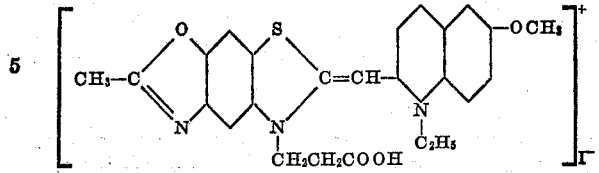

This dye was prepared from 0.37 gram (0.001 mole) of 3 - carboxyethyl - 2,6 - dimethyloxazolo[4,5 - f]benzothiazolium iodide, and 0.38 gram (0.001 mole) of 1-ethyl-2-ethylmercapto-6-methoxyquinolinium iodide using the method described in Example VIII. The resultant dye had an absorption maximum at 487 mµ.

*Example XI.—3,9-diethyl-5-methoxy-3'-methyl-5',6'-[2-methyloxazolo 4,5]selenathiacarboxyanine iodide*

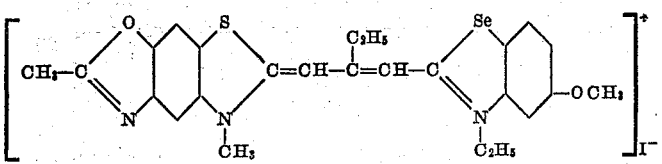

A mixture of 0.346 gram (0.001 mole) of 2,3,6-trimethyloxazolo[4,5-f]benzothiazolium iodide, 0.47 gram (0.001 mole) of 2-(β-methylmercapto)-butenyl-(1)-5-methoxybenzoselenazolium iodide, 7 mls. of methanol and 16 drops of triethylamine was heated for 5 minutes on a steam bath. The dye which separated on cooling was purified with methanol; absorption maximum 558 mµ.

*Example XII.—4,5-benzo-3,9-diethyl-3'-methyl-5',6'-[2-methyloxazolo 4,5]thiacarbocyanine iodide*

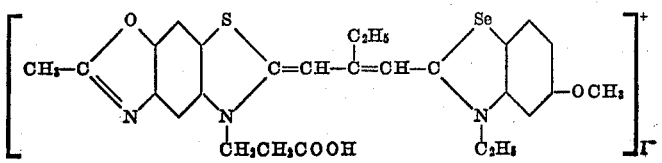

This dye was prepared from 0.35 gram (0.001 mole) of 2,3,6-trimethyloxazolo[4,5-f]benzothiazolium iodide and 0.43 gram (0.001 mole) of 2-(β-methylmercaptobutenyl-(1))-3-methyl-4,5-benzothiazolium iodide essentially as described in Example XI. The absorption maximum in alcohol was 560 mµ.

*Example XIII.—4,5-benzo-3,3',9-triethyl-5',6'-[2-methyloxazolo 4,5]thiacarbocyanine iodide*

This dye was prepared from 0.36 gram (0.001 mole) of 2,6-dimethyl-3-ethyloxazolo[4,5-f]benzothiazolium iodide and 0.43 gram (0.001 mole) of 2-(β-methylmercaptobutenyl-(1))-3-methyl-4,5-benzothiazolium iodide essentially as described in Example XII. The absorption maximum in ethanol was 563 mµ.

*Example XIV.—3'-carboxyethyl-3,9-diethyl-5-methoxy-5',6'-[2-methyloxazolo 4,5] selenathiacarbocyanine iodide*

This compound was prepared from 0.37 gram (0.001 mole) of 3-carboxyethyl-2,6-dimethyloxazolo[4,5-f]benzothiazolium iodide and 0.47 gram (0.001 mole) of 2-(β-methylmercapto) butenyl-(1)-5-methoxybenzoselenazolium iodide according to the procedure described in Example XII. The resultant dye had an absorption maximum at 563 mμ.

*Example XV.—4,5-benzo-3'-carboxyethyl-9-ethyl-3-methyl-5',6'-[2-methyloxazolo 4,5]thiacarbocyanine iodide*

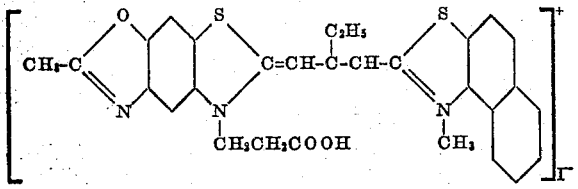

The above dye was synthesized from 0.37 gram (0.001 mole) of 3-carboxyethyl-2,6-dimethyloxazolo[4,5-f] benzothiazolium iodide and 0.43 gram (0.001 mole) of 2-(β-methylmercapto) butenyl-(1)-3-methyl-4,5-benzobenzothiazolium iodide as described in Example XII. The absorption maximum in ethanol was 565 mμ.

Many variations of my invention will occur to persons skilled in the art. For instance, in the synthesis of the 5-aryldiazo-6-hydroxybenzothiazole which serves as an intermediate for the preparation of the oxazolobenzothiazole, other diazonium salts may be used in place of the phenyldiazonium chloride illustrated by the example. The use of oxazolobenzothiazole nuclei which are substituted in the 2-position by a benzyl group leads to carbocyanines which carry a benzene nucleus as substituent of the trimethine chain in the α-position. The use of oxazolobenzothiazoles, which are substituted in the 6-position by aralkyl or aryl groups or by alkyl groups other than the illustrated methyl group leads to dyes which contain the corresponding substituent in the 6-position of the oxazolobenzothiazole nucleus. I, therefore, do not intend to be limited in the patent granted except as necessitated by the appended claims.

I claim:

1. A process of preparing 2,6-dimethyloxazolo[4,5-f] benzothiazole which comprises coupling 6-hydroxy-2-methylbenzothiazole with an aryl diazonium salt, reducing the resulting 6-hydroxy-2-methyl-5-aryl diazobenzothiazole in an alkaline medium to form the 5-amino-6-hydroxy-2-methylbenzothiazole, acetylating the latter with an excess of acetic anhydride, removing the excess of acetic anhydride, and effecting closure of the oxazole ring by heating the acylated product to its boiling point under reduced pressure.

2. A process of preparing 2,6-dimethyloxazolo[4,5-f] benzothiazole which comprises coupling 6-hydroxy-2-methylbenzothiazole with a phenyldiazonium salt, reducing the resulting 6-hydroxy-2-methyl-5-phenyldiazobenzothiazole in an alkaline medium to form the 5-amino-6-hydroxy-2-methylbenzothiazole, acetylating the latter with an excess of acetic anhydride, removing the excess of acetic anhydride, and effecting closure of the oxazole ring by heating the acylated product to its boiling point under reduced pressure.

3. Sensitizing dye intermediates selected from the group consisting of the compounds having the following general formulae:

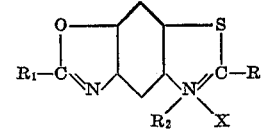

and

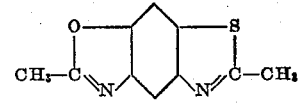

wherein R is selected from the class consisting of methyl, ethyl, propyl and butyl, $R_1$ is selected from the class consisting of methyl, ethyl, propyl and butyl, $R_2$ is a member selected from the class consisting of methyl, ethyl, propyl, -hydroxyethyl, -hydroxypropyl, carboxymethyl and carboxyethyl and wherein X is an anion.

4. A sensitizing dye intermediate having the following formula:

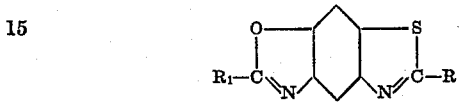

5. 2,3,6-trimethyloxazolo 4,5-f benzothiazolium iodide.

6. 3-ethyl-2,6-dimethyloxazolo 4,5-f benzothiazolium iodide.

7. 3-carboxymethyl-2,6-dimethyloxazolo 4,5-f benzothiazolium bromide.

8. 3-carboxyethyl-2,6-dimethyloxazolo 4,5-f benzothiazolium iodide.

References Cited in the file of this patent

Elderfield: "Heterocyclic Compounds," vol. 5, pages 420–4 (1957).